United States Patent [19]

Mitchell et al.

[11] 4,405,976
[45] Sep. 20, 1983

[54] AUDIO TRACKING PULSE-WIDTH MODULATED POWER SUPPLY

[75] Inventors: Daniel M. Mitchell, Cedar Rapids; William J. Durspek, Marion, both of Iowa

[73] Assignee: Rockwell International Corporation, El Segundo, Calif.

[21] Appl. No.: 331,037

[22] Filed: Dec. 16, 1981

[51] Int. Cl.³ .......................................... H02M 3/335
[52] U.S. Cl. ..................................................... 363/72
[58] Field of Search ..................................... 363/71, 72

[56] References Cited

U.S. PATENT DOCUMENTS 3,671,846  6/1972  Corey ............................... 363/72 X Primary Examiner—William M. Shoop
Attorney, Agent, or Firm—Richard K. Robinson; Howard R. Greenberg; H. Fredrick Hamann

[57] ABSTRACT

An audio signal tracking power converter has a master converter and a slave inverter which are connected in parallel to a dc power source that is to be converted and provide a first and second ac output signal. The first ac signal and the second ac signal are combined and converted to a dc signal that tracks the input audio signal. The master inverter is controlled by a free-running pulse generator which pulse-width modulates the first portion of the dc power that is converted to the first ac signal. The slave inverter is pulse-width modulated by pulses that result from the comparison of the audio signal that is to be tracked and a reference signal generated from the pulses from the free-running pulse generator.

15 Claims, 3 Drawing Figures

AUDIO TRACKING PULSE-WIDTH MODULATED POWER SUPPLY

BACKGROUND OF THE INVENTION

The invention pertains generally to dc/dc power converters and specifically to a balanced converter which provides a dc output voltage that tracks the amplitude and phase of a sensed audio signal.

The efficiency of a linear RF power amplifier is improved when the dc voltage that is applied to the RF power amplifier tracks the audio signal that also modulates the RF signal that is to be amplified by the power amplifier. This tracking of the input audio signal by the power supply that is modulating the excitation to the power amplifier results in the power amplifier maintaining a constant collector-to-emitter voltage across its output transistors. Although the prior art power converters that provided buck (output dc voltage is less than the dc input voltage) and boost (dc output voltage is greater than the dc input voltage) and/or both buck and boost, lend themselves to the above application, the prior art dc-to-dc converters (such as that disclosed in U.S. Pat. No. 3,898,549) were not able to respond linearly to the full audio range of signals, especially as the frequency of the audio input signal approached 20 KHz. To be linear, when tracking signals having a frequency at or near 20 KHz, the switching frequency of an inverter associated with the dc converter must be around 100 KHz which corresponds to a full-wave rectified output frequency of 200 KHz or 10 times the highest signal frequency. The maximum duty cycle of the pulse-width modulated signals of the prior art dc-to-dc converters is about 0.8, which corresponds to the maximum dc voltage output with a minimum dc voltage input. The conductive time under the condition of minimum output voltage, corresponding to minimum input audio signal, and maximum input voltage is typically 1.2 $\mu s$ at a 200 KHz switching frequency. This time is much shorter than the typical storage time of the bipolar transistors in the switching inverter of the dc/dc converter. Consequently, this phenomenon precludes a linear modulated response of the dc-to-dc prior art converters.

SUMMARY OF THE INVENTION

An audio signal tracking power converter has a master inverter and a phase-controlled slave inverter, both operating near maximum duty cycle, which are connected in parallel to a dc power source that is to be converted and provide a first and second ac output signal. The first ac signal and the phase controlled second ac signal are combined and converted to a dc signal that tracks the input audio signal. The master inverter is controlled by a free-running pulse generator which converts the dc power from the first ac signal. The slave inverter is synchronized to the master inverter and its controlling pulse generator is phase shifted in accordance with an error signal formed from the combination of the audio signal that is to be tracked, a dc reference signal, and a dc feedback signal generated from the combined supply output.

It is the primary objective of the present invention to provide a new and improved dc/dc power converter that will respond linearly in both phase and amplitude to an audio signal of up to 20 KHz.

It is a further object of the present invention to provide a dc/dc power converter which uses two switching power supplies that are frequency synchronized but which are separated by a variable phasing to facilitate combining by the transformer action of a combining transformer set.

It is still a further object of the present invention to provide a modulated dc/dc power converter for an RF power amplifier that ensures that the collector-to-emitter voltage of the output transistors of the RF amplifier is constant over a specified audio range of frequencies and amplitude of a modulating input audio signal.

BRIEF DESCRIPTION OF THE DRAWINGS

The invention may be best understood by referring to the detailed description here and below together with the drawings in which.

DESCRIPTION OF THE INVENTION

Figure 1:
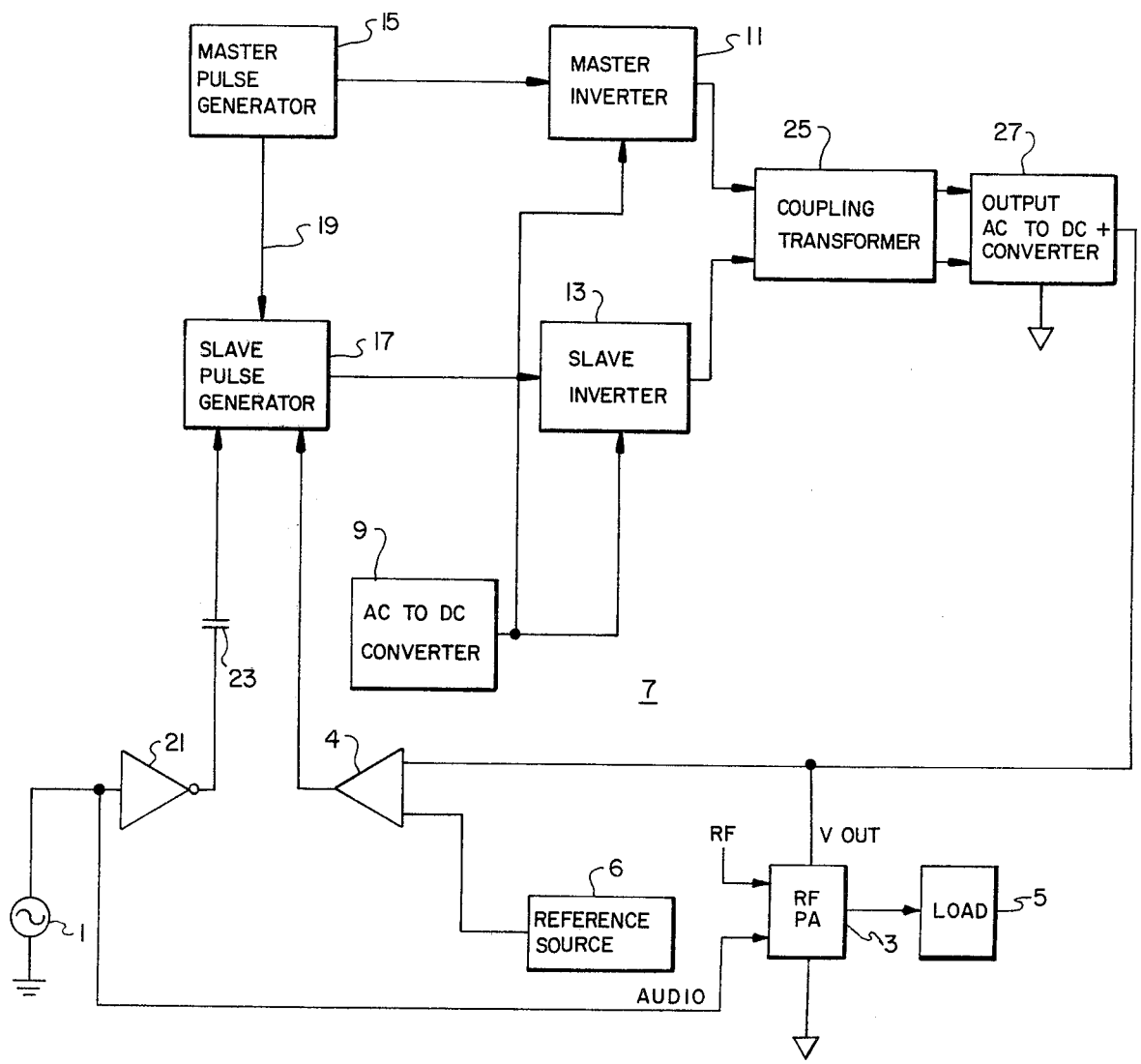
FIG. 1 is a block diagram of a level modulated dc/dc converter according to the invention.

There is shown an audio source 1 which provides an audio signal to an RF power amplifier 3 which modulates the rf signal for application to a load 5. The RF power amplifier 3 has connected across a positive and negative power terminal the output from a dc power source 7. The dc power source 7 converts a dc voltage that is provided by an ac-to-dc converter 9 to a dc voltage whose amplitude varies in phase with the amplitude of the audio signal provided by the signal source 1. The DC power source includes a master inverter 11 and a slave inverter 13. The master inverter 11 is driven by a master pulse generator 15, which in the preferred embodiment is a free running multivibrator and clock driver. The slave inverter 13 is driven by the slave pulse generator 17 which is synchronized by the pulses from the master pulse generator applied thereto via a conductor 19. The slave pulse generator 17 control pulses to the slave inverter 13 are phase modulated by a combination of the audio signal from the audio signal source 1, that is applied to the slave pulse generators 17 via buffer amplifier 21 and capacitor 23, and the output from error amplifier 4 which is derived from the dc feedback signal and dc reference 6.

The first ac signal that is provided by the master inverter 11, and the second variable phase ac signal that is provided by the slave inverter 13, are combined through transformer action by a coupling transformer 25. The secondary of the coupling transformer 25 is connected to an output ac-to-dc converter 27 which converts the combined ac signals from the coupling transformer 25 to a modulated dc signal whose amplitude tracks the amplitude of the audio signal that is provided by the audio signal source 1, and whose average dc level is set by a reference source that is applied to an error amplifier.

Figure 2:
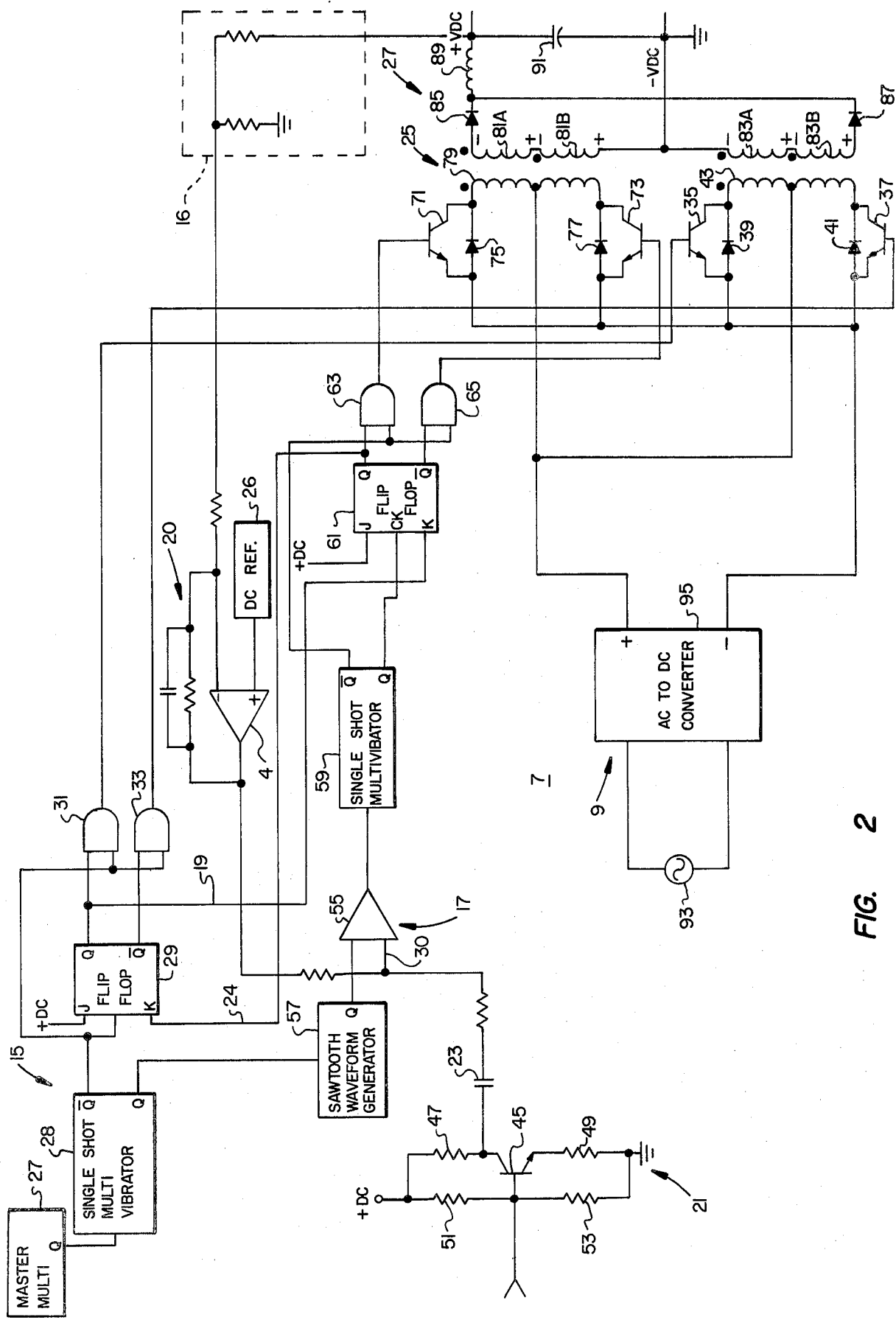
FIG. 2 is a schematic diagram of the dc/dc converter of FIG. 1.

FIG. 2, to which reference should now be made, is a schematic diagram of the dc-to-dc converter 7 of FIG. 1. The master pulse generator 15 consists of a master multivibrator 27, whose Q output is applied to a single shot multivibrator 28 whose outputs are in turn applied simultaneously to flip-flop 29, sawtooth generator 57, and to AND gates 31 and 33. AND gate 31 combines the Q output of flip-flop 29 with the Q output of the multivibrator 28 whereas AND gate 33 combines a $\overline{Q}$ output of the multivibrator 28 with the $\overline{Q}$ output of the flip-flop 29. The application of the output of multivibrator 28 to AND gates 31 and 33 performs a crossover blanking function to prevent simultaneous conduction of output switching transistors 35 and 37. The AND gates 31 and 33 drive the master inverter that includes output switching transistors 35 and 37, diodes 39 and 41, and a primary winding 43 which is part of the coupling transformer 25.

The buffer amplifier 21, in the preferred embodiment, is a transistor 45 whose gain is established by the resistors 47 and 49. Transistor 45 is biased by resistors 51 and 53 which are series connected between a dc voltage source (not shown) and ground. The buffered audio signal is applied to the slave pulse generator 17, and more particularly, to the comparator 55. The comparator 55 compares the audio signal from the audio signal source 1 after being summed with the dc signal from the error amplifier 4 with a sawtooth waveform that is provided by a sawtooth waveform generator 57. The comparator 55 provides a triggering signal each time the amplitude of the sawtooth signal from the sawtooth waveform generator 57 exceeds the amplitude of the sum of the audio signal provided by the buffer amplifier 21 and the dc signal from the error amplifier 4. The trigger pulse from the comparator 55 is used to trigger single shot multivibrator 59 which provides pulses to flip-flop 61 and AND gates 63 and 65. As in the master drive circuit, the $\overline{Q}$ output of multivibrator 59 is connected to AND gates 63 and 65 to provide crossover blanking to prevent simultaneous conduction of transistors 71 and 73. Interconnections 19 and 24 interlock flip-flop 61 to flip-flop 29 so that on power-up of the power supply circuit, flip-flop 61 is always in the same place in relationship to flip-flop 29. Connected thusly, an increasing ac voltage from buffer 21 will always produce an increasing dc output from the power supply at the junction of filtering components inductor 89 and capacitor 91.

Supply output voltage at the junction of inductor 89 and capacitor 91 is reduced by level attenuator 16 and is then applied to error amplifier 4 where it is compared with a dc reference voltage from dc reference source 26. The dc reference voltage sets the dc level at the power supply output with no audio input to buffer amplifier 21. A feedback network 20 rolls off the response of the error amplifier 4 below the lowest frequency of input audio signal applied to amplifier 21. The output from error amplifier 4 is added to audio from buffer-amplifier 21 at the input to comparator 17. AND gates 63 and 65 drive the slave inverter 13 that includes transistors 71 and 73, diodes 75 and 77, and primary winding 79 which is part of the coupling transformer 25. The coupling transformer 25 includes the primary windings 79 and 43 and the secondary windings 81A and 81B, and 83A and 83B. Primary winding 79 has center tap that is connected to the positive output terminal of an ac-to-dc converter 95 which is part of the ac-to-dc converter 9.

Signal source 93 provides the ac signal that is converted to dc by the ac-to-dc converter 95. The center tap of primary winding 43 is similarly connected to the positive terminal of the ac-to-dc converter 95. The primary winding 79 has associated with it a secondary winding 81A and 83A and the primary winding 43 has associated with it the secondary winding 82B and 83B. Connected thusly, the secondary windings are in a flux aiding series configuration so that the voltages from the two switching power supplies may add or subtract in accordance with the phase of the slave switching pulse generator. The secondary windings 81A and B and 83A and B couple the combined ac signals to the output ac-to-dc converter 27 that includes the diodes 85 and 87 and an LC filter network of an inductor 89 and a capacitor 91.

Figure 3:
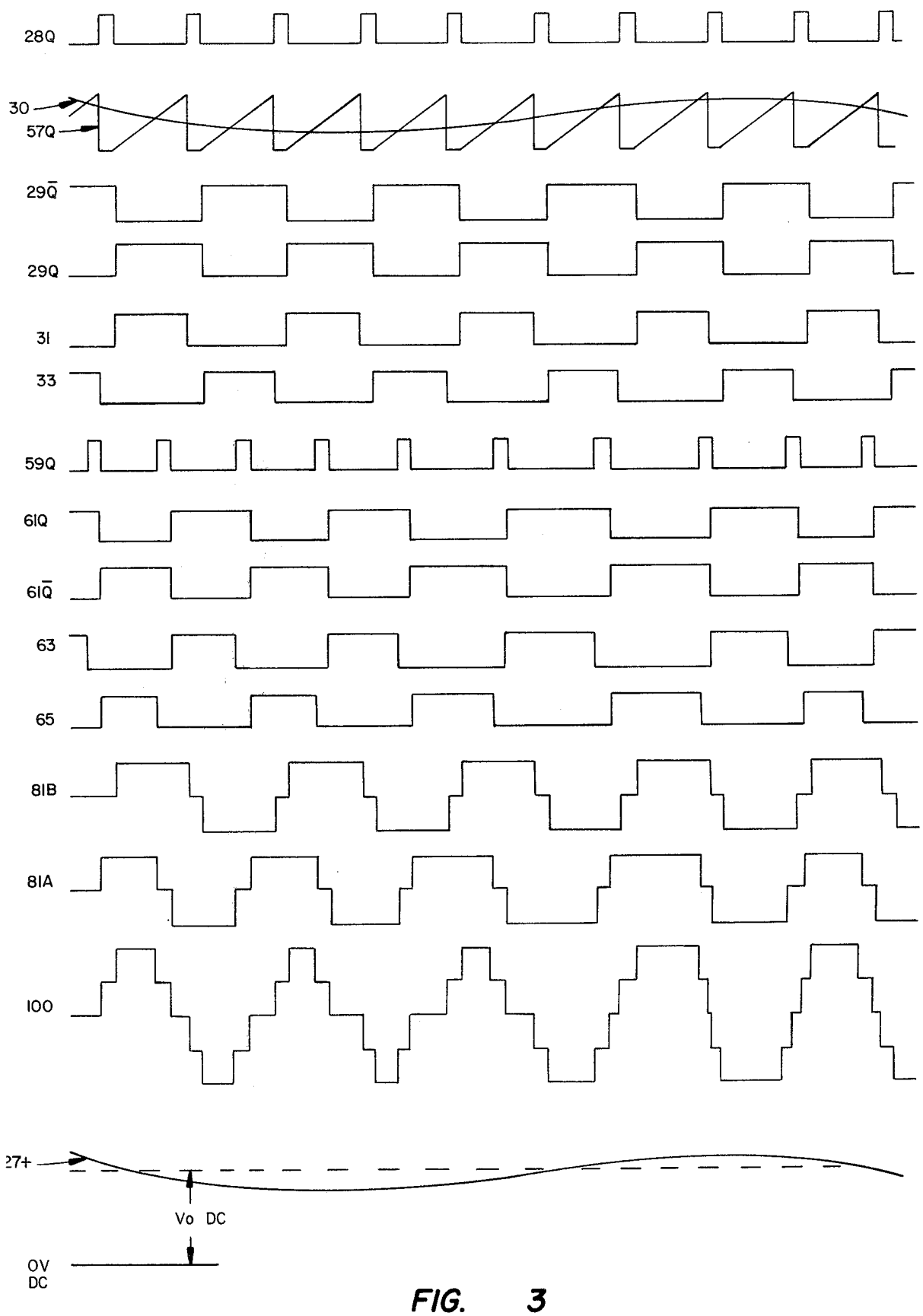
FIG. 3 is a timing diagram of the operation of the level modulated dc/dc converter of FIG. 2.

FIG. 3, a timing diagram of the operation of the circuit represented by the schematic of FIG. 2, shows the waveforms of the circuit elements according to the reference numerals and terminal letters with C representing the collector output and Q is the output that is present on the Q terminal of the identified device. The output of the multivibrator 28 is shown by waveform 28-Q. Waveform 30 is the sum of the buffered audio signal that is provided by the audio signal source 1 and the dc from error amp 20 output and is the signal that the dc/dc power converter 7 is to track. Waveform 57Q represents the output of the sawtooth waveform generator 57. The comparator 55 compares the signals represented by waveform 57Q and waveform 30 which results in the single shot multivibrator 59 providing the output pulses represented by waveform 59Q. The output of the flip-flop 29 which is driven by the multivibrator 28 is illustrated by waveform 29Q. Waveform 31 represents the output of AND gate 31 and is the logical combination of waveform $\overline{28Q}$ with waveform 29Q. Waveform 33 is the output of AND gate 33 and is the logical combination of waveform $\overline{28Q}$ and waveform $\overline{29Q}$. The Q output of the single shot multivibrator 59 is represented by waveform 59Q which is used to toggle the flip-flip 61. The output waveforms flip-flop 61 are illustrated by waveform 61Q and waveform $\overline{61Q}$. The output of the flip-flop 61 of FIG. 2 is combined with the output of the single shot multivibrator 59 and by AND gates 63 and 65. The result of this combination is provided by waveforms 63 and 65 of FIG. 3. The signal that is present across windings 81A and 81B is represented by waveform 100. It should be noted that in a similar manner the waveforms across secondary windings 83A and 83B are developed and are combined by the output ac-to-dc converter 27. Waveform 27 is, of course, the modulated output of the ac-to-dc converter 27 that is illustrated in FIG. 1 and corresponds to the junction of the inductor 89 and the capacitor 91 shown in FIG. 2. Waveform 100 shows the composite output of one-half of the secondary windings.

Many changes and modifications in the above described embodiment of the invention can, of course, be carried out without departing from the scope thereof. Accordingly, the invention is disclosed and is intended to be limited only by the scope of the appended claims.

We claim:

1. An audio signal tracking power supply, comprising:

master pulse generator means for generating master control pulses;

slave pulse generator means, responsive to the audio signal, for generating slave control pulses;

dc power supply means for providing dc power;

master inverter means for inverting a first part of the dc power to a first ac signal, the master inverter means being controlled by the master control pulses;

slave inverter means for inverting a second part of the dc power to a second ac signal, the slave inverter means being controlled by the slave control pulses; and output converter means for converting the first and second ac signals to a dc output signal.

2. The audio signal tracking power supply according to claim 1 wherein the master pulse generator means comprises:
- a free-running multivibrator means that operates at a preselected frequency for providing a first and second stream of pulses that are the complement of each other; and
- master inverter driver means for converting the second stream of pulses into pulses that the master inverter means will respond.

3. The audio signal tracking power supply according to claim 1 or 2 wherein the slave pulse generator means comprises:
- reference generator means for generating a reference signal;
- comparator means for comparing the reference signal to the audio signal and to provide a first logic pulse each time the audio signal exceeds the reference signal; and
- slave inverter driver means for converting the first logic pulse into a pulse that the slave inverter means will respond.

4. The audio signal tracking power supply according to claim 3 wherein the reference signal generator means comprises:
- a clock source means for providing a stream of clock pulses with a fixed duty cycle of a preselected on-time period and a preselected off-time period; and
- sawtooth generator means, synchronized by the stream of clock pulses, for providing a sawtooth signal whose amplitude increases with time during the preselected off-time period.

5. The audio signal tracking power supply according to claim 1 further comprising:
- synchronization means for synchronizing the slave control pulses with the master control pulses.

6. A combination of an audio signal source, an rf power amplifier, and a dc/dc power supply wherein the dc-to-dc power supply comprises:
- master pulse generator means for generating master control pulses;
- slave pulse generator means, responsive to an audio signal from the audio signal source, for generating slave control pulses;
- dc power supply means for providing dc power;
- master inverter means for inverting a first part of the dc power to a first ac signal, the master inverter means being controlled by the master control pulses;
- slave inverter means for inverting a second part of the dc power to a second ac signal, the slave inverter means being controlled by the slave control pulses; and
- output converter means for converting the first and second ac signals to a dc output signal.

7. The combination according to claim 6 wherein the master pulse generator means comprises:
- a free-running multivibrator means that operates at a preselected frequency for providing a first and second stream of pulses that are the complement of each other; and
- master inverter driver means for converting the second stream of pulses into pulses that the master inverter means will respond.

8. The combination according to claim 7 wherein the slave pulse generator means comprises:
- referenced generator means for generating a reference signal from the first stream of pulses;
- comparator means for comparing the reference signal to the audio signal and to provide a first logic pulse each time the audio signal exceeds the reference signal; and
- slave inverter means for converting the first logic pulse into a pulse that the slave inverter means will respond.

9. The combination according to claim 8 wherein the reference signal generator means comprises:
- sawtooth generator means synchronized by the first stream of pulses for providing a sawtooth signal whose amplitude increses with time between pulses of the first stream of pulses.

10. The combination according to claim 6 further comprising:
- synchronizing means for synchronizing the slave control pulses with the master control pulses.

11. A method for providing power to an rf power amplifier from a power supply that tracks an audio signal comprising:
- generating master control pulses;
- generating slave control pulses from the audio signal;
- providing dc power;
- inverting a first part of the dc power to a first ac signal with the master control pulses;
- inverting a second part of the dc power to a second ac signal with the slave control pulse; and
- converting the first and second ac signal to a dc output signal.

12. The method according to claim 11 wherein the step of generating master control pulses comprises:
- providing a first and second stream of pulses that are the complement of each other; and
- converting the second stream of pulses into the master control pulses.

13. The method according to claim 11 or 12 wherein the step of generating slave control pulses comprises;
- generating a reference signal;
- comparing the reference signal to the audio signal and provide a first logic pulse each time the audio signal exceeds the reference signal; and
- converting the first logic pulses into the slave control pulses.

14. The method according to claim 13 wherein the step of generating a reference signal comprises:
- providing a stream of clock pulses with a fixed duty cycle of a preselected on-time period and a preselected off-time period, and
- providing a sawtooth signal, synchronized by the clock pulses, whose amplitude increases with time during the off-time period.

15. The method according to claim 11 further comprising the step of:
- synchronizing the slave control pulses with the master control pulses.

* * * * *